July 17, 1956  R. A. WHITLOCK, JR., ET AL  2,755,246
WATER TREATMENT APPARATUS
Filed March 28, 1952  3 Sheets-Sheet 1

Inventors
Robert A. Whitlock, Jr.
James E. Dymond
By McCanna and Morsbach
Attys.

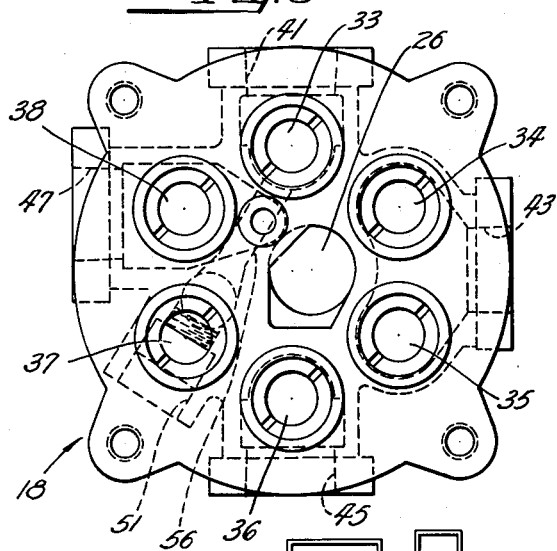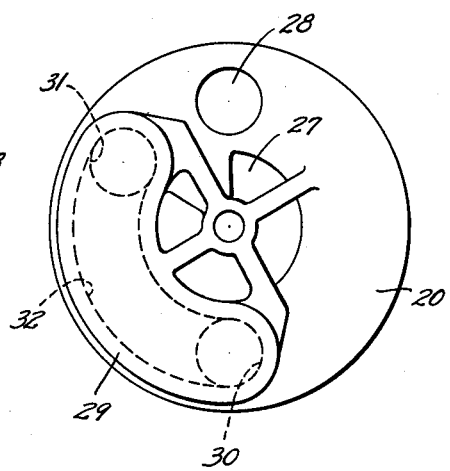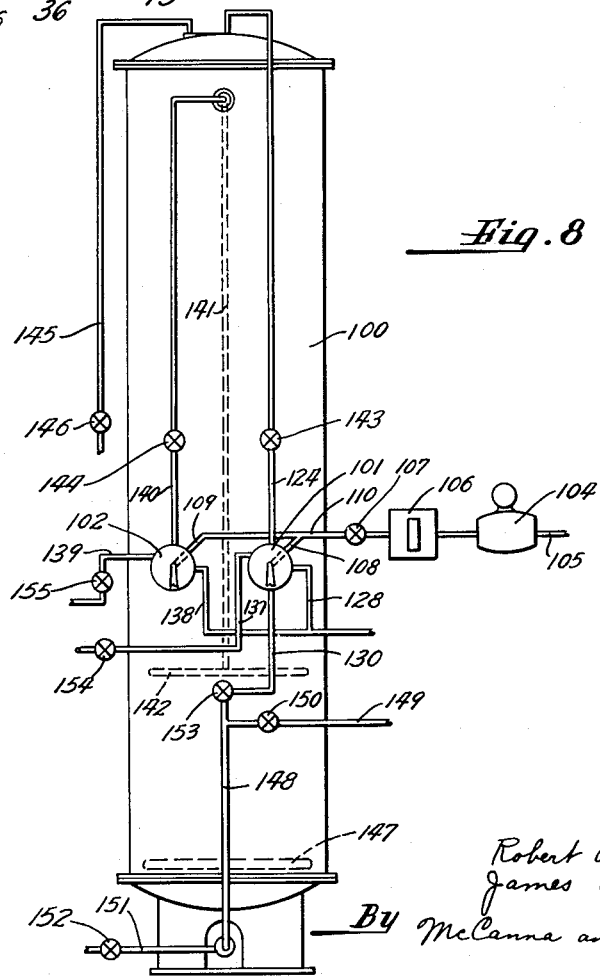

Inventors
Robert A. Whitlock, Jr.
James E. Dymond
BY McCanna and Morsbach
Attys.

United States Patent Office 2,755,246
Patented July 17, 1956

2,755,246
WATER TREATMENT APPARATUS

Robert A. Whitlock, Jr., and James E. Dymond, Rockford, Ill., assignors to Aquamatic Inc., a corporation of Illinois Application March 28, 1952, Serial No. 279,051

6 Claims. (Cl. 210—24)

This invention relates to a control system for mixed-bed or "mono bed" water deionization apparatus.

In the purification of water by the removal of the undesired salts in the water, one type of apparatus for this purpose is the mixed-bed or "mono bed" system in which the anion and cation exchange resins are contained in a single tank. In this type of water treatment apparatus, during the service run the cation and anion exchange resins are thoroughly mixed so as to present an almost infinite series of alternate cation and anion exchange beds downward through the treatment tank. This type of apparatus has been found to produce water of exceptionally high quality which is remarkably low in total dissolved solids content. The present invention is concerned with a control system for controlling the various flows through the mixed-bed treatment tank during the service run and during the various steps in the regeneration of the cation and anion exchange resins in the tank.

It is an object of this invention to provide a control system for a mixed-bed water deionization apparatus which is simpler in its operation because of the reduced number of control valves needed.

Another object of this invention is to provide a novel control system for a mixed-bed water demineralization apparatus which is more flexible in its operation than previous systems, enabling certain steps in the regeneration cycle to be carried out selectively in more than one particular sequence.

Another object of this invention is to provide a novel control system for mixed-bed water deionization apparatus which employs in a novel manner multi-port lift-turn valves of standard construction and proven performance characteristics.

Other and further objects and advantages of the invention will be apparent from the following description of two preferred embodiments thereof, shown in the accompanying drawings.

In the drawings:

Figure 5 is a top view of the stator or back plate of the Fig. 4 control valve;

Figure 6 is a top view of the rotor or stem plate of the Fig. 4 control valve;

Figure 8 is a view similar to Fig. 1, but shows a second embodiment of the control system of the present invention;

Figure 1:
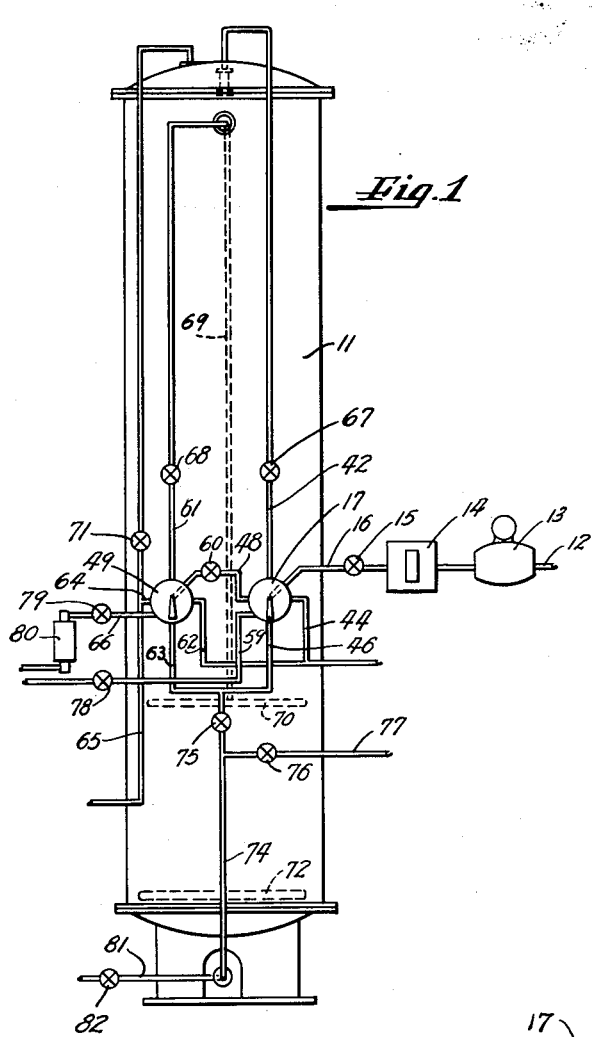
Figure 1 is a schematic front view of a mixed-bed water treatment apparatus including a first form of the control system of the present invention.
Figure 2:
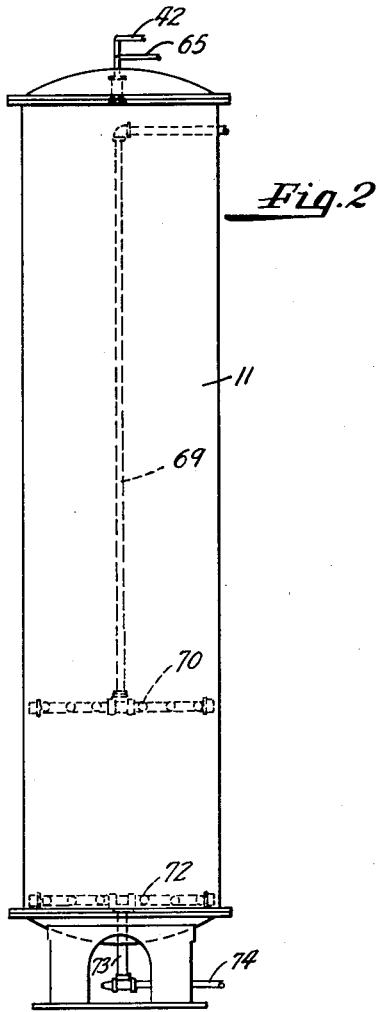
Figure 2 is a side view of the treatment tank in Fig. 1, showing in greater detail portions of the piping arrangement associated therewith.
Figure 3:
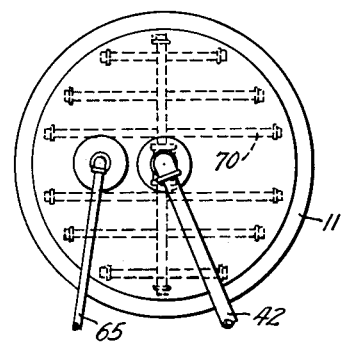
Figure 3 is a top view of the Fig. 1 treatment tank.
Figure 9:
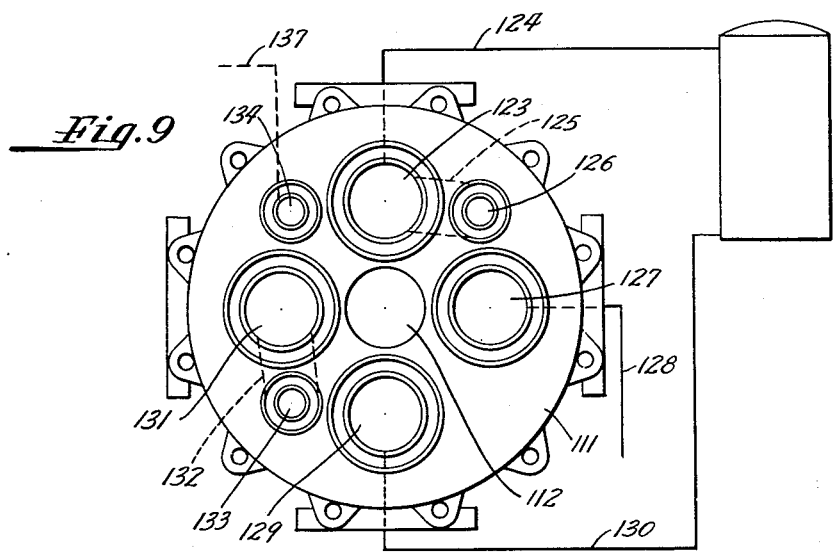
Figure 10:
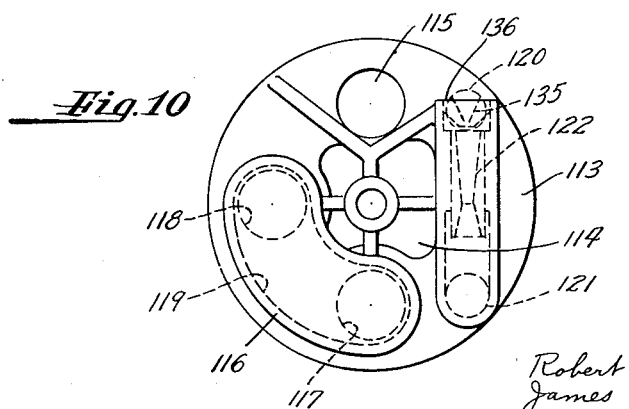

Figure 9 is a top view of the stator or back plate of one of the multi-port lift-turn valves in the Fig. 8 control system (these valves having a different construction and somewhat different mode of operation from those in the Fig. 1 system) and diagrammatically showing certain of the connections from this control valve; and Figure 10 is a top view of the rotor or stem plate of one of the Fig. 8 control valves.

Referring to the control system of Figs. 1–7, the treatment tank 11 is of the mixed-bed or "mono bed" type, containing both the anion and cation exchange resins so that the deionization of the water is accomplished in this single tank. A plurality of conduits and valves, which constitute the control system of the present invention, are suitably connected to the treatment tank to establish the necessary flows of water to and from the treatment tank during the service run, and to establish the necessary flows of water and reagent to and from the treatment tank during the various steps in the regeneration of the cation and anion exchange resins in the treatment tank.

From the inlet pipe 12, raw or untreated water passes through a water meter 13, which indicates the total volume of water which has been passed to the treatment tank, and thence through a flow meter 14, which indicates the instantaneous rate of flow of raw water from the inlet pipe 12. A normally open main shut-off valve 15 leads to the main inlet conduit 16, which leads to the main inlet port of a first control valve 17 of the lift-turn type.

Figure 4:
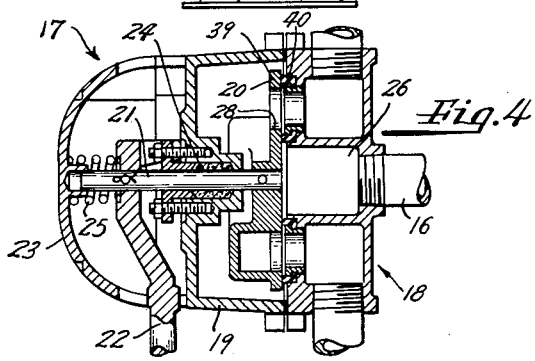
Figure 4 is a section through one of the multi-port lift-turn valves in the Fig. 1 control system.

Referring now to Figs. 4–6, the control valve 17 includes a stator or back plate 18, a stationary housing or cover 19 abutting against the back plate 18 in fluid-tight relation therewith, a rotor or stem plate 20 located within the housing 19, a rotor shaft 21 attached to the stem plate and extending outwardly through the cover 19, a handle 22 attached to the rotor shaft for adjusting the angular position of the stem plate, and an outer stationary bonnet 23. Suitable fluid-tight packing 24 is provided to prevent leakage around the rotor stem 21 through the cover 19. A compression coil spring 25 acts between the bonnet 23 and the handle 22 at the rotor stem 21 to normally bias the stem plate 20 toward engagement with the inner face of the back plate 18.

The port and passage arrangement in the back plate 18 of the valve includes a centrally located inlet passage 26, which receives raw water from the conduit 16 connected to the outer or rear face of the back plate. Immediately above the inlet passage 26 in the back plate of the control valve, the rotor or stem plate 20 is of spider-like configuration presenting a plurality of holes 27, which are positioned to pass raw water from the inlet passage 26 in the stem plate into the chamber enclosed by the housing or cover 19 and the inner face of the back plate 18.

The rotor 20 also includes a hole 28 located radially outwardly from the axis of the rotor, and an arcuate transfer channel member 29, which is located at the same radial distance from the axis of the rotor or stem plate. The transfer channel includes a pair of spaced ports 30 and 31 located to be disposed immediately adjacent the inner face of the back plate 18 and an arcuate passageway 32 extending between the ports 30 and 31. As best seen in Fig. 6, the transfer passage 32 has an arcuate extent of 120 degrees and has its port 31 spaced from the rotor port 28 by 60 degrees.

The back plate 18 at its inner face is formed with six evenly-spaced ports 33, 34, 35, 36, 37 and 38, located on the same radius as the rotor or stem plate ports 28, 30 and 31, so as to be adapted to communicate selectively therewith. At each of these ports in the back plate there is provided an annular sleeve 39 (Fig. 4) threadedly received in the back plate and a resilient gasket 40 of rubber, or the like, clamped in place by the sleeve 39. These gaskets are engaged by the outer face of the stem plate 20 and prevent leakage at the adjacent faces of the back plate and the stem plate. Port 33 in the back plate communicates with a passage 41 at the top of the valve, which has connected to it a pipe 42 (Fig. 1) leading to the top of the treatment tank. Ports 34 and 35 in the back plate both communicate with a passage 43 at the right side of the back plate to which is connected a conduit 44 leading to drain. Port 36 in the back plate communicates with a back plate passage 45 at the bottom of the valve to which is connected a pipe 46 adapted to communicate with the bottom of the treatment tank. Port 38 in the back plate communicates with a passage 47 at the left side of the back plate to which is connected a conduit 48 leading to the inlet of the other lift-turn control valve 49.

Figure 7:
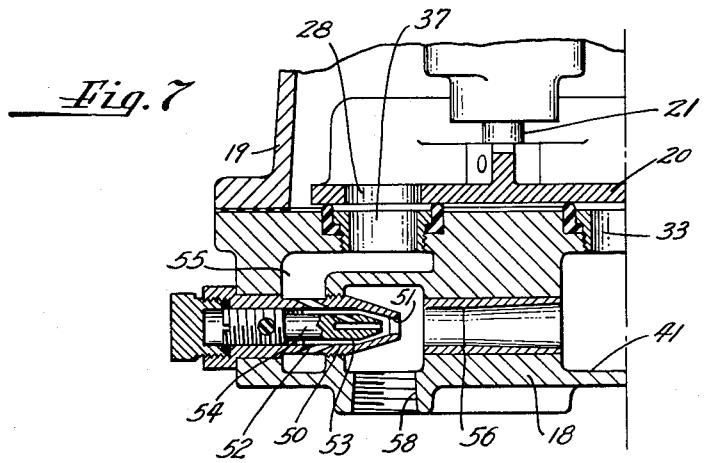
Figure 7 is a fragmentary section through the control valve of Figs. 4–6, showing the ejector in this valve for drawing reagent into and through this valve.

Between the port 37 in the back plate and the passage 41 at the top of the back plate there is provided an ejector, shown in detail in Figs. 5 and 7. The ejector includes an outer nozzle 50 formed with a discharge passage 51 at its forward end, a plurality of forwardly inclined inlet passages 52 along its length, and an annular lengthwise passageway 53, formed between the outer nozzle and an adjustable needle valve 54, extending between the inlet passages 52 and the discharge passage 51. A passageway 55 in the back plate extends between the back plate port 37 and the inlet passages 52 of the nozzle. The discharge from the ejector nozzle passes through a venturi-shaped throat 56 leading to the passage 41 at the top of the valve. An inlet passage 58 is formed in the outer face of the back plate to communicate with the ejector between the nozzle and the throat. A reagent feed pipe 59 (Fig. 1), which leads from a source of caustic soda (not shown), is connected to this inlet passages 58 of the back plate so that water discharged from the nozzle through the throat of the ejector draws caustic through the line 59 into the ejector. The ejector discharges into the back plate passage 41 communicating with the top of the treatment tank. Line 59 has a shutoff valve 78 controlling the flow through it.

The rotor or stem plate 20 has four operative angular positions with respect to the back plate:

In the No. 1 operative position of the rotor, which is shown in Fig. 6, the rotor passage 28 communicates with the back plate port 33.

In the No. 2 operative position of the rotor 20 of the control valve 17, the rotor is displaced 60 degrees counterclockwise from its No. 1 position, and the rotor passage 28 communicates with the back plate port 38, the transfer passage port 31 communicates with the back plate port 37, and the other transfer passage port 30 communicates with the back plate port 35.

In the No. 3 operative position of the rotor of the control valve 17, the rotor is displaced an additional 60 degrees counterclockwise from its No. 2 position, so that the rotor passage 28 communicates with the back plate port 37, the transfer passage port 31 communicates with the back plate port 36, and the other transfer passage port 30 communicates with the back plate port 34.

In the No. 4 operative position of the valve rotor 20, the rotor is displaced a further 60 degrees counterclockwise from its No. 3 position, with the rotor passage 28 in communication with the back plate port 36, the transfer passage port 31 in communication with the back plate port 35, and the other transfer passage port 30 in communication with the back plate port 33.

The locating of the rotor at each of these positions is accomplished by lifting the handle 22 against the force of spring 25 and turning the handle until the rotor is properly positioned, the handle dropping into a properly located slot in the bonnet 23 for each of these rotor positions.

Another position of the rotor 20 and handle 22 is used when it is desired to drain the tank. In this position the rotor 20 is lifted away from the back plate and is turned to a position where the rotor handle rests on a rim portion of the bonnet 23 between two of the aforementioned slots. At this "rim" position the rotor is maintained spaced from the adjacent face of the back plate, so that all flows go through passages in the back plate only.

The second lift-turn control valve 49 is identical in construction and port arrangement to the valve 17. This second control valve has a raw water inlet from pipe 48 through a check valve 60 which permits water to flow only from control valve 17 to control valve 49 but not vice versa, a top passage (corresponding to the passage 41 in valve 17) connected to a pipe 61 leading into the treatment tank, a passage at its right side (corresponding to the passage 43 in valve 17) leading to a drain pipe 62, a bottom passage (corresponding to the passage 45 in valve 17) leading to a downwardly extending pipe 63 adapted to communicate with the bottom of the treatment tank, and a passage at its left side (corresponding to the passage 47 in valve 17) leading to a pipe 64 in communication with an air relief and drain conduit 65. Valve 49 is also formed with an inlet passage (corresponding to the passage 58 in valve 17) leading from the acid line 66 and communicating with an ejector in the back plate of valve 49 in the same manner as passage 58 in valve 17. There is a shutoff valve 79 and an instantaneous flow rate indicator 80 in the acid line 66, which leads from a source of concentrated acid (not shown).

The upwardly extending pipe 42 leading from the top passage in control valve 17 communicates with the top of tank 11 through a shutoff valve 67.

The upwardly extending pipe 61 leading from the top passage in control valve 49 communicates through a shutoff valve 68 with a pipe 69 extending downward into the tank. A distributor or manifold 70, which consists of a plurality of interconnected slotted pipes, communicates with pipe 69 at the bottom thereof. The distributor 70 is located at the interface between the anion and cation exchange resins in the treatment tank when the resins have been separated to be regenerated separately.

The air relief pipe 65 at one end communicates with atmosphere and at its other end communicates with the top of the tank 11. A shutoff valve 71 is provided in the air relief pipe 65.

At the bottom of the treatment tank there is provided a lower distributor or manifold 72, consisting of a plurality of interconnected apertured pipes. From the lower distributor 72 a conduit 73 (Fig. 2) leads out of the bottom of the tank and thence through a conduit 74. A shutoff valve 75 is located between conduit 74 and the conduits 46 and 63 leading from the respective control valves 17 and 49. Another shutoff valve 76 controls the communication between conduit 74 and the service conduit 77 for treated water.

A pipe 81 leading from a source of compressed air, also communicates with pipe 73 leading to the lower distributor 72. A shutoff valve 82 controls the flow of compressed air through pipe 81.

*Operation*

In the operation of the control apparatus of Figs. 1–7, during the service run valves 15, 67, and 76 are open and the other shutoff valves 68, 71, 79, 78 and 75 are closed, control valve 17 is in its No. 1 position and control valve 49 is in its No. 1 position. Valve 82 in the compressed air line 81 is also closed. Thus, water from inlet pipe 16 flows into the main inlet passage 26 in the back plate of valve 17, through the central rotor passages 27 into the chamber enclosed by housing 19, out of this chamber through rotor passage 28, back plate port 33 and passage 41 up through pipe 42 into the top of the treatment tank. The water flows down through the treatment tank, where the mineral solids content is removed by the ion exchange resins, and out through the lower distributor 72 and pipes 73 and 74 to the service line 77.

During the service run, in the event that both the multi-port control valve 17 and the shutoff valve 75 should leak, the system of Figs. 1–7 prevents untreated water from being passed through these leakage paths to the service line 77 to contaminate the treated water therein. Thus, if, due to leakage in the multi-port valve 17, raw water should be passed through this valve to line 46, it would flow through conduit 63, valve 49 and conduit 64 to the low pressure outlet at drain line 65, rather than following the leakage path through valve 75 to the high pressure service line 77. The flow path for dumping to drain any raw water which might leak through valve 17 to conduit 46 includes conduit 63, the bottom passage in the back plate of control valve 49 (corresponding to the passage 45 in valve 17), through the rotor transfer passage in valve 49, and out through the back plate passage at the left side of valve 49 (corresponding to the passage 47 in valve 17) to conduit 64 and thence to drain line 65.

When the ion exchange resins in the tank require regeneration, the regeneration cycle is initiated by establishing backflow upward through the tank. This is accomplished with shutoff valves 15, 75 and 67 open, valves 68, 71, 79, 78, and 82 closed, control valve 17 in its No. 4 position, and control valve 49 in its No. 2 position. Thus, water from inlet pipe 16 flows into the main inlet passage 26 in the back plate of valve 17, through the central rotor passages 27 into the chamber enclosed by valve housing 19, out of this chamber through rotor passage 28, back plate port 36 and back plate passage 45 down through pipes 46 and 74, and thence up through pipe 73 and the lower distributor 72 at the bottom of tank 11. The water backwashes vigorously up through tank 11 and leaves through conduit 42 at the top of the tank, flowing downward through conduit 42 into the passage 41 in the back plate of control valve 17. From this passage the water flows out of back plate port 33 and through rotor transfer passage port 30 into the rotor transfer passage 32 and thence through transfer passage port 31, back plate port 35, back plate passage 43 and pipe 44 to drain. Some of the water during backwash passes through the upper distributor 70 up pipe 69 and thence down through pipe 61 to the top passage in control valve 49, from which it passes back through the throat of the ejector in the back plate of this valve and thence through the rotor transfer passage in this valve to drain. Drawing off some of the water at distributor 70 in this manner reduces the upward velocity of the water above this level, thereby reducing the possibility that some of the relatively light anion exchange resin might be washed out of the tank during backwash. This backwash of water up through the treatment tank caused the anion and cation exchange resins, which previously had been thoroughly mixed throughout the service run, to separate into two well-defined separate stratas, with the heavier cation exchange resin settling to the bottom of the tank. After the completion of the backwash, there is a clear line of demarcation between the cation and anion exchange resins at the level of the upper distributor 70, the cation exchange resin being below this line and the anion exchange resin above it.

Following backwash the thus-separated cation and anion exchange resins are regenerated separately. With the present invention this can be done by regenerating the anion exchange resin first, or vice versa. With certain types of water tested, better results have been obtained by first regenerating the anion exchange resin, which was not possible in previous systems for controlling apparatus of this type.

To regenerate the anion exchange resin, shutoff valves 15, 67, 68 and 78 are open and valves 71, 79, 85, 76 and 82 are closed, control valve 17 is in its No. 3 position, and control valve 49 is in its No. 4 position. Thus, water from inlet pipe 16 flows into the main inlet passage 26 in the back plate of valve 17, through the central rotor passages 27 into the chamber enclosed by valve housing 19, out of this chamber through the rotor passage 28, back plate port 37 and passage 55 and through the ejector nozzle 50 (Fig. 7). The discharge of water through the ejector throat 56 draws caustic soda through pipe 59, inlet passage 58 in the back plate and through the throat of the ejector and out the valve passage 41 leading through line 42 to the top of the treatment tank 11. After flowing down through the anion exchange resin to regenerate the same, the caustic is drawn off through the upper distributor 70 at the interface between the separate anion and cation exchange resin beds, flowing upwardly through pipe 69 and thence down through pipe 61 to the top passage in the back plate of control valve 49 (which corresponds to the top passage 41 in the first control valve 17). From this passage the fluid flows through the rotor transfer passage in valve 49 and to the back plate passage at the right side of this valve and thence to drain line 62. When the desired amount of caustic has been injected valve 78 may be closed, and the rest of the valves maintained as before so that water rinses down through the anion exchange resin and is discharged to drain.

For regenerating the cation exchange resin in the treatment tank, shutoff valves 15, 68, 75 and 79 are open and valves 67, 71, 78, 76 and 82 are closed, control valve 17 is in its No. 2 position, and control valve 49 is in its No. 3 position. In these positions of the valves, water from inlet pipe 16 flows into the main inlet passage 26 in the back plate of valve 17, through the central rotor passages 27 into the chamber enclosed by valve housing 19, out of this chamber through rotor passage 28, back plate port 38, and back plate passage 47 at the left side of valve 17 to line 48 leading through check valve 60 to the main inlet passage in the back plate of the second control valve 49. From this inlet, the water flows up into the chamber above the rotor and thence down through the rotor passage, corresponding to rotor passage 28 in valve 17, and through the ejector in this valve to draw acid from line 66 to flow out of valve 49 into the pipe 61 leading to the upper distributor 70 located at the interface between the anion and cation exchange resins. From this distributor the acid flows down through the bed of cation exchange resin and out through the distributor 72 at the bottom of the treatment tank. From here the fluid flows through pipe 73 and up through pipes 74 and 63 to the back plate passage at the bottom of control valve 49 (corresponding to the passage 45 in the first control valve 17) and thence through the rotor transfer passage in this valve to the drain line 62. When a sufficient amount of acid has been injected, the acid line valve 79 may be closed and the rest of the valves maintained as before so that water rinses down through the cation exchange resin and is discharged to drain.

By providing a siphon break in the drain pipe 44 for the control valve 17, air is admitted through pipe 42 to the top of the treatment tank during the cation regeneration step to permit the water above the top of the anion resin to begin to drain out of the tank. Thus, air in the drain line 44 passes through the back plate passage 43 at the right side of the valve 17 and thence through back plate port 35, rotor transfer passage port 30, through rotor transfer passage 32, out the rotor transfer passage port 31, through back plate port 37, through the ejector nozzle 50 and throat 56, out the back plate port 41 at the top of valve 17, and thence up through pipe 42 to the top of the treatment tank 11. This not only initiates the draining of the tank, but also insures that the acid does not rise into the anion resin bed while the cation resin bed is being regenerated.

If the water in the tank has not drained to the level of the top of the anion bed by the time that the acid injection step is completed, then a further draining step is carried out. In this step, shutoff valves 71 and 75 are open and valves 15, 67, 68, 79, 78, 76 and 82 are closed, and both of the control valves 17 and 49 are put at their described "rim" positions. Air passes through pipe 65 to the top of the treatment tank and water drains out the bottom of the tank and through both of the control valves 17 and 49 to drain. Taking valve 17 as an example, in the "rim" position of its rotor the rotor is displaced away from the adjacent inner face of the back plate, so that drain water entering this valve at the lower back plate passage 45 passes through back plate port 36 direct to the adjacent back plate port 35 and thence through back plate passage 43 to the drain line 44.

Following this, it is necessary to again thoroughly mix the cation and anion exchange resins throughout the treatment tank 11, so as to present an almost infinite series of alternate anion and cation exchange beds. One conventional way to do this is by admitting compressed air through the pipe 81 to pipe 73 and thence to the lower distributor 72 at the bottom of the treatment tank. The compressed air agitates the cation and anion exchange resins and mixes them thoroughly in the tank. During this step, valve 71 in the air relief line 65 is open to release the compressed air from the top of the tank. All of the other shutoff valves 15, 67, 68, 71, 79, 78, 75 and 76 are closed, and control valves 17 and 49 are both in their No. 1 positions in this step.

Having thoroughly mixed the anion and cation exchange resins, the next step is to give the final rinse to the ion exchange materials in the treatment tank. During this final rinse step, shutoff valves 15, 67 and 75 are open and valves 68, 71, 79, 78, 76 and 82 are closed, and control valves 17 and 49 are both in their respective No. 1 positions. Thus, water from inlet pipe 16 flows into the main inlet passage 26 in the back plate of valve 17, through the central rotor passages 27 into the chamber enclosed by valve housing 19, out of this chamber through rotor passage 28, back plate port 33 and back plate passage 41 at the top of valve 17, up through pipe 42 into the treatment tank at the top thereof. After flowing downward through the mixed ion exchange bed in tank 11 the rinse water flows out through the lower distributor 72 and pipe 73, up through pipes 74 and 63 into the back plate passage at the lower end of the valve 49. From here, the rinse water flows through the rotor transfer passage of valve 49 and through conduits 64 and 65 to drain.

When the water has rinsed sufficiently to obtain the desired low value of total dissolved solids content in the treated water, valve 75 is closed and valve 76 is opened and the apparatus is ready for the next service run, with the treated water being passed to the service line 77.

In a second form of the control system of the present invention, which is shown in Figs. 8-10, there are provided two lift-turn multi-port valves 101 and 102 of a different type from those in the system of Figs. 1-7 for controlling the various flows to and from the treatment tank 100. This system includes a volume meter 104 leading from the inlet pipe 105, a flow rate indicator 106 and a main shutoff valve 107. Branch pipes 108 and 109 are connected in parallel to the main inlet pipe 110 and lead respectively to the main inlets of the control valves 101 and 102.

The control valve 101 is constructed substantially similar to U. S. Patent 2,299,802 to Lee G. Daniels but has somewhat different flow paths. It includes a back plate or stator 111 (Fig. 9) having a centrally located main inlet passage 112 in communication with the branch inlet pipe 108 for receiving raw water therefrom. The rotor or stem plate 113 (Fig. 10), which is located with a housing similar to the described arrangement of Figs. 4-7, is formed with a plurality of ribs at its center arranged in a spider-like configuration to provide central inlet ports 114 in the rotor positioned to communicate with the central inlet port 112 in the back plate of this valve.

The rotor 113 also is formed with a discharge passage 115 located radially outward from the axis of the rotor, and an arcuate channel member 116, which is located at the same radial distance from the axis of the rotor. The channel member 116 is formed with a pair of spaced ports 117 and 118 at the face of the rotor adjacent the back plate and an arcuate transfer passageway 119 extending between these ports. As shown in Fig. 10, the transfer passage 119 has an arcuate extent of 90 degrees and its port 118 is spaced 90 degrees from the rotor passage 115. The rotor 113 is also formed with ports 120 and 121 which are interconnected by the venturi-shaped throat 122 of an ejector, which is mounted on the rotor. The ejector also includes a nozzle 135 which at its inlet end 136 communicates with the valve chamber enclosing the rotor, and which discharges into the throat 122 of the ejector.

The back plate 111 of the valve 101 is formed with an upper passage 123, spaced radially from the central inlet passage 112, which communicates with the top of tank 100 through pipe 124. A branch passage 125 in the back plate communicates between top passage 123 and an auxiliary port 126 in the back plate. A passage 127 at the right side of the back plate, spaced 90 degrees clockwise from the upper passage 123 and at an equal radial distance from the axis of the back plate, communicates with a drain pipe 128. A bottom passage 129 in the back plate, positioned diametrically opposite the upper passage 123, communicates with a pipe 130 leading to the bottom of treament tank 100. Spaced midway around the back plate 111 at the left side thereof there is provided a passage 131, which is plugged. An internal branch passage 132 in the back plate extends between the left side passage 131 and a port 133 formed in the inner face of the back plate midway between the passages 129 and 131, which performs no useful function in the present system. Another passage 134 at the top left side of the stem plate communicates with the caustic feed pipe 137, leading from a source of caustic soda (not shown).

The rotor or stem plate 113 of control valve 101 has three operative positions with respect to the back plate 111:

In the No. 1 operative position of the rotor, indicated in Fig. 10, the rotor passage 115 registers with the top passage 123 in the back plate.

In the No. 2 operative position of the rotor, it is displaced 180 degrees from its No. 1 position, so that rotor passage 115 registers with the bottom passage 129 in the back plate, rotor transfer passage port 117 registers with the top passage 123 in the back plate, and rotor transfer passage port 118 registers with the right side passage 127 in the back plate.

In the No. 3 operative position of the rotor, it is displaced 90 degrees clockwise from its No. 2 position, so that rotor passage 120 leading to the ejector throat 122 registers with the caustic feed passage 134 in the back plate, the ejector discharge port 121 registers with the back plate port 126, rotor transfer passage port 118 registers with the lower back plate passage 129, and rotor transfer passage port 117 registers with the right side passage 127 in the back plate.

The second lift-turn control valve 102 is substantially identical in construction to the above-described valve 101, the only difference residing in the fact that the bottom passage in its back plate (corresponding to the passage 129 in valve 101) is plugged and has no connection to the bottom of the treatment tank. Valve 102 has its central main inlet passage in its back plate connected through branch inlet pipe 109 direct to the raw water inlet. The right side passage in the back plate of valve 102 is connected to drain pipe 138. The upper left side passage in the back plate of valve 102 is connected to the acid feed line 139. The top passage in the back plate of valve 102 is connected to a pipe 140, which leads to a pipe 141 extending downward within the tank 100 to the upper distributor 142 therein.

This system also includes a shutoff valve 143 in the pipe 124 leading from control valve 101 to the top of the treatment tank, a shutoff valve 144 in the pipe 140 leading from control valve 102 to the upper distributor 142, an air relief line 145 under the control of a shutoff valve 146 leading to the top of the tank, a lower distributor 147 at the bottom of the tank leading through pipe 148 to the service line 149 which has a shutoff valve 150, a compressed air line 151 leading to the lower distributor 147 and controlled by a shutoff valve 152, a shutoff valve 153 controlling the communication between pipe 148 leading from the lower distributor and pipe 130 which leads from the bottom passage 129 in the back plate of control valve 101, and shutoff valves 154 and 155 respectively in the caustic and acid supply lines 137 and 139.

Operation

In the operation of this second form of the invention, during the service run shutoff valves 107, 143 and 150 are open and valves 144, 146, 155, 154, 153 and 152 are closed, control valve 101 is in its No. 1 position and control valve 102 is in its No. 1 position. Thus water from inlet pipe 110 flows through branch pipe 108 to the central main inlet passage 112 in the back plate of control valve 101, through the central rotor passages 114 into the chamber enclosed by the valve housing and thence through rotor passage 115 and the top passage 123 in the back plate up through pipe 124 to the top of the treatment tank. The water flows down through the mixed-bed of anion and cation exchange resins in the tank, which remove the objectionable minerals from the water, and then out through the lower distributor 147 and through pipe 148 to the service line 149.

When the ion exchange resins in the tank require regeneration, the regeneration cycle is initiated by establishing backflow upward through the tank. This step is carried out with shutoff valves 107, 143 and 153 open and valves 144, 146, 155, 154, 150 and 152 closed. Control valve 101 is in its No. 2 position and control valve 102 is in either its No. 1 or No. 2 position. Thus, water from the inlet pipe 110 flows through branch pipe 108 to the central main inlet passage 112 in the back plate of control valve 101, through the central rotor passages 114 into the chamber enclosed by the valve housing and thence through rotor passage 115 and the bottom passage 129 in the back plate down through pipe 148 to the lower distributor 147 at the bottom of tank 100. The water backwashes vigorously up through the treatment tank and leaves from the top of the tank through pipe 124 and from there flows through the top back plate passage 123 in valve 101 and through transfer passage port 117, transfer passage 119, transfer passage port 118 and passage 127 at the right side of the back plate to drain line 128. As in the previous system, this back wash separates the cation and anion exchange resins so that they are respectively below and above the level of the lower distributor 142.

Following backwash, the anion exchange resin is regenerated. In this step, shutoff valves 107, 143, 144 and 154 are open and valves 146, 155, 150, 152 and 153 are closed, control valve 101 is in its No. 3 position and control valve 102 is in its No. 2 position. Water from inlet pipe 110 flows through branch pipe 108 to the central main inlet passage 112 in the back plate of control valve 101, through the central rotor passages 114 into the chamber enclosed by the valve housing and from this chamber through the nozzle inlet 136 into the ejector nozzle 135. Water discharged from the ejector nozzle through the throat 122 draws dilute caustic soda from line 137 through back plate passage 134 and rotor passage 120 into the ejector throat 122, the stream of water and caustic passing out the ejector outlet port 121 through back plate port 126, branch passage 125 in the back plate, top passage 123 in the back plate and through pipe 124 to the top of the treatment tank. After flowing down through the anion exchange resin to regenerate the same, the caustic is drawn off through the upper distributor 142, up through pipe 141 and down through pipe 140 to the top passage in the back plate of control valve 102, from which it passes through the rotor transfer passage in this valve to the drain line 138. When the desired amount of caustic has been injected, the valve 154 may be closed and the other valves maintained as before so that water rinses down through the anion exchange bed and is discharged to drain.

For regenerating the cation exchange resin in the treatment tank, shutoff valves 107, 144, 155 and 153 are open and valves 143, 146, 154, 150 and 152 are closed, control valve 101 is in its No. 3 position, and control valve 102 is in its No. 3 position. The rinsing of the cation exchange resin continues as before. Also, water from inlet pipe 110 flows through branch pipe 109 to the central main inlet in the back plate of control valve 102. The water flows through the ejector in this valve and draws acid from the acid supply pipe 139 in the same manner as caustic is drawn into control valve 101 in the caustic injection step described above. The water and acid mixture flows from the ejector of control valve 102 through pipes 140 and 141 and is discharged at the upper distributor 142 in the tank. The acid stream flows down through the cation exchange resin and leaves the bottom of the tank through the lower distributor 147, from which it flows up through pipes 148 and 130 to the bottom passage 129 in the back plate of control valve 101. From here, the acid stream flows through rotor transfer passage port 118, rotor transfer passage 119 and rotor transfer passage port 117 to back plate passage 127 and thence to drain line 128. After sufficient acid has been injected to regenerate the cation exchange resin in the acid line valve 155 may be closed leaving the other valves as before, the water rinsing down through the cation exchange resin and being discharged to drain.

Either the caustic injection step or the acid injection step may be performed first, as desired.

Following the reagent injection steps, the water in the treatment tank is drained down to the level of the top of the anion exchange resin. During this step, valve 153 and air relief valve 146 are open, shutoff valves 107, 143, 144, 155, 154, 150 and 152 are closed, and control valves 101 and 102 remain in their respective No. 3 positions, so that water in the tank is permitted to pass through control valve 101 to drain, as in the acid injection step.

Following this, the anion and cation exchange resins are mixed thoroughly by compressed air from line 151 when valve 152 in this line is opened. During this step, valve 146 in the air relief line 145 is open to release air under pressure from the top of tank 100. At this time, shutoff valves 107, 143, 144, 155, 154, 153 and 150 are all closed.

Finally, the treatment tank is refilled and the final rinse given. During the final rinse shutoff valves 107, 143 and 153 are open, shutoff valves 144, 146, 155, 154, 150 and 152 are closed, control valve 101 is in its No. 3 position, and control valve 102 is in its No. 1 position. Water passes through control valve 101 as in the caustic injection step, passing up through pipe 124 to the top of the treatment tank and from the lower distributor 147 at the bottom of the treatment tank up through pipes 148 and 130 to the back plate passage 129 at the bottom of control valve 101. From here the water enters the rotor transfer passage 119 through the port 118 at one end of the latter and is discharged through the other rotor transfer passage port 117 and the back plate passage 127 at the right side of valve 101 to the drain line 128.

Following the final rinse, the control system is again set for the next service run.

While in the foregoing description there are disclosed two specific preferred embodiments of the present invention, it is to be understood that modifications, omissions and refinements departing from the specific described embodiments of the invention may be adopted which do not depart from the spirit and scope of our invention.

We claim:

1. Water treatment apparatus comprising, in combination, a water treatment tank containing cation and anion exchange resins, conduits communicating respectively with the top and bottom of the treatment tank, a distributor located at the level of the line of demarcation between the cation and anion exchange resins when the latter are separated into separate beds in the tank, a caustic reagent supply line, an acid reagent supply line, a pair of multi-port valves each having a plurality of operative positions, drain lines connected to said valves, a first one of said valves in one of its operative positions being operative to pass water downward through the treatment tank during the service run, said first one of the valves in a second operative position being operative to pass water upward through the treatment tank during backwash, said first one of the valves in a third operative position being operative to draw caustic reagent from said caustic reagent line and to pass the same to the top of the treatment tank and the second of said valves having an operative position for drawing said caustic reagent from the tank through said distributor for passage to drain during the caustic reagent feed step, and the second of said valves in another of its operative positions coacting with the first of said valves to draw acid reagent from said acid reagent line and to pass the same to said distributor and to pass said reagent from the bottom of the treatment tank to drain during the acid reagent feed step, said valves being interconnected to pass through said second valve and thence to drain any untreated water which leaks through the first valve when the latter is in said one of its operative positions.

2. Water treatment apparatus comprising, in combination, a water treatment tank containing cation and anion exchange resins of different densities, with the cation exchange resin being the heavier, conduits communicating respectively with the top and bottom of the treatment tank, a distributor within the tank located at the level of the line of demarcation between the cation and anion exchange resins when the latter are separated into separate beds in the tank to be regenerated separately, with the heavier cation exchange resin being located below the distributor and the anion exchange resin above it, a raw water supply line, a service line adapted to communicate with the bottom of the treatment tank, a first multi-port valve having a plurality of operative positions and including an ejector and a transfer passage, said first valve communicating with said raw water supply line and being operative to be in communication selectively with the top and bottom of the treatment tank, a caustic reagent supply line connected to said first valve, a second multi-port valve having a plurality of operative positions and including an ejector and a transfer passage, said second valve being operative to communicate selectively with said distributor, an acid reagent supply line connected to said second valve, drain lines connected to said first and second valves, said first valve in a first one of its operative positions during the service run being operative to pass water from said raw water supply line to the top of the treatment tank, said first valve in a second one of its operative positions during backwash being operative to pass water from said raw water supply line to the bottom of the treatment tank and to pass the backwash effluent from the top of the treatment tank through the transfer passage in the first valve to drain, said first valve in a third one of its operative positions in the caustic injection step being operative to effect communication between said caustic reagent supply line and an inlet of the ejector in the first valve and between said raw water inlet line and an inlet of the ejector in the first valve and between the outlet of the ejector in the first valve and the top of the treatment tank so that water flows from said raw inlet line through said ejector to draw caustic reagent from said caustic reagent supply line for passage to the top of the treatment tank and thence downward through the bed of anion exchange resin in the tank, said second valve in one of its operative positions during the caustic injection step being operative to communicate between said distributor and drain through its transfer passage to pass the caustic effluent from the treatment tank through said distributor and thence through the transfer passage in the second valve to drain, said second valve in another of its operative positions being positioned to effect communication between said raw water inlet and an inlet of the ejector in the second valve and between said acid reagent supply line and an inlet of the ejector in the second valve and between the outlet of the ejector in the second valve and said distributor in the treatment tank, and said first and second valves in said last-mentioned position of the second valve coacting in the acid injection step to pass water from said raw water inlet through the ejector in the second valve to draw acid reagent from said acid reagent supply line for passage to said distributor and thence downward through the bed of cation exchange resin in the treatment tank and to pass the acid effluent from the bottom of the treatment tank to drain.

3. The apparatus of claim 1, wherein said first valve includes passage means for passing air to the top of the treatment tank during the acid reagent feed step for initiating the draining of the treatment tank and for preventing acid introduced into the treatment tank during the acid reagent feed step from rising up into the anion exchange resin bed.

4. Water treatment apparatus comprising a water treatment tank containing cation and anion exchange materials, a raw water inlet line and a drain line, a first conduit communicating with the top of the treatment tank and a second conduit communicating with the bottom of the treatment tank, a first multi-port valve connected to the first conduit and communicating with said inlet and drain lines, said first valve being operable between a plurality of preselected settings during the cycle of regeneration of the exchange material to control the flows to and from the top of the tank, a distributor located at the level of the line of demarcation between the anion and cation exchange materials when the latter are separated in the tank, a second multi-port valve communicating with the inlet and drain lines and connected to said distributor, said second valve being operable between a plurality of preselected settings during the cycle of regeneration of the exchange material to control the flows to and from the distributor, a caustic reagent supply line communicating with said first valve, an acid reagent supply line communicating with said second valve, said first valve including an injector means and passage means for passing raw water from the inlet line through the injector means in one of the settings of the valve to draw caustic from the caustic supply line and for passing the diluted caustic to the top of the treatment tank, said second valve including passage means for communicating the distributor and the drain line in one setting of the valve to discharge the caustic effluent from the tank, said second valve including injector means and passage means for passing raw water from the inlet line through the injector means in another setting of the valve to draw acid from the acid supply line and for passing the diluted acid to the distributor, said first valve including passage means for communicating the bottom of the tank and drain line in another setting of the valve to discharge the acid effluent from the tank to drain.

5. Water treatment apparatus comprising in combination, a water treatment tank containing cation and anion exchange materials, a raw water inlet line and a drain line, a first conduit communicating with the top of the tank and a second conduit communicating with the bottom of the treatment tank, a first multi-port control valve connected to said conduits and to said inlet and drain lines and operable between a plurality of preselected settings to selectively control the flows to and from the top of the tank during the cycle of regeneration of the bed of exchange material therein, a distributor located at the level of the line of demarcation between the anion and cation exchange materials when the latter are separated in the tank, a second multi-port control valve connected to said distributor and to said inlet and drain lines and operable between preselected settings to selectively control the flows to and from said distributor during the regeneration of the bed of exchange material in the tank, a shut-off valve in said second conduit between the first control valve and the bottom of the tank, a service line connected to said second conduit between the shut-off valve therein and the bottom of the tank, and conduit means communicating at one end with said second conduit between the shut-off valve and the first control valve and connected at the other end thereof to said second control valve, said second control valve including passage means for communicating said conduit means and said drain line in one of the settings of said second valve to pass to drain any raw water which leaks past the first control valve.

6. The combination of claim 5 including means connected the inlet line through the first control valve to the second control valve to supply raw water to the latter under the control of the first control valve.

References Cited in the file of this patent

UNITED STATES PATENTS

| | | |
|---|---|---|
| 1,942,807 | Dotterweich | Jan. 9, 1934 |
| 1,942,808 | Dotterweich | Jan. 9, 1934 |
| 2,248,055 | Bird | July 8, 1941 |
| 2,254,421 | Eickmeyer et al. | Sept. 2, 1941 |
| 2,315,223 | Riche | Mar. 30, 1943 |
| 2,363,167 | Daniels | Nov. 21, 1944 |
| 2,376,543 | Lawler | May 22, 1945 |
| 2,578,937 | Kunin et al. | Dec. 18, 1951 |
| 2,578,938 | Kunin et al. | Dec. 18, 1951 |
| 2,598,362 | Daniels | May 27, 1952 |
| 2,692,244 | Kunin | Oct. 9, 1954 |

OTHER REFERENCES

Chemical Engineering, pp. 162–163, Feb. 1950.

Industrial and Engineering Chem., pp. 730–734, Mar. 1951.